(12) United States Patent
Vlahovic

(10) Patent No.: US 7,891,706 B2
(45) Date of Patent: Feb. 22, 2011

(54) STIFFENING DEVICE

(75) Inventor: Josip Vlahovic, Freiberg am Neckar (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 101 days.

(21) Appl. No.: 12/189,244

(22) Filed: Aug. 11, 2008

(65) Prior Publication Data

US 2009/0085336 A1     Apr. 2, 2009

(30) Foreign Application Priority Data

Sep. 28, 2007    (DE)    ........................ 10 2007 046 534

(51) Int. Cl.
*B60R 21/13* (2006.01)
(52) U.S. Cl. .............. 280/756; 296/107.03; 296/190.03
(58) Field of Classification Search ................. 280/756; 296/102, 107.01, 107.03, 181.4, 190.03, 296/193.01, 193.02, 203.03, 24.43, 24.44, 296/24.45, 24.46; D12/222

See application file for complete search history.

(56) References Cited

U.S. PATENT DOCUMENTS

| 6,443,517 | B1 | 9/2002 | Just et al. |
| 7,481,476 | B2 * | 1/2009 | Heiss et al. ............... 296/24.43 |
| 2004/0130136 | A1 * | 7/2004 | Muller ....................... 280/756 |
| 2005/0046235 | A1 * | 3/2005 | Robertson et al. ....... 296/193.02 |
| 2005/0061498 | A1 * | 3/2005 | Tohda et al. ................. 165/204 |
| 2006/0049660 | A1 * | 3/2006 | Schaller et al. ............. 296/103 |
| 2009/0085376 | A1 * | 4/2009 | Schmitt ................. 296/190.03 |

FOREIGN PATENT DOCUMENTS

EP    1 203 679 B1    5/2002

* cited by examiner

*Primary Examiner*—Ruth Ilan
*Assistant Examiner*—Keith Frisby

(57) ABSTRACT

A single-part or multi-part stiffening device for increasing the torsional stiffness of a motor vehicle embodied as a cabriolet, has at least one stiffening element which is connected at one side to a rear side of a rollover protection device and at the other side to a base of a covering shelf of the motor vehicle.

12 Claims, 7 Drawing Sheets

STIFFENING DEVICE

CROSS-REFERENCE TO RELATED APPLICATION

This application claims the priority, under 35 U.S.C. §119, of German application DE 10 2007 046 534.5, filed Sep. 28, 2007; the prior application is herewith incorporated by reference in its entirety.

BACKGROUND OF THE INVENTION

Field of the Invention

The present invention relates to a stiffening device for increasing the torsional stiffness of a motor vehicle embodied as a cabriolet (convertible). The invention also relates to a motor vehicle fitted with a stiffening device of this type.

Compared with completely closed vehicles, for example a coupe, cabriolets differ significantly in the configuration of the supporting body. As a result of the lack of a roof as a stiffening component, the overall stiffness of the nowadays usually monocoque-type bodies must be ensured by a reinforced underbody. Despite the reinforced base, cabriolets consistently have problems with regard to their torsional stiffness, and must be provided with additional stiffening in this respect. Additional stiffening elements of this type are however often difficult to arrange on account of installation space, and can only partially make up for the loss in stiffness resulting from the lack of a fixed roof.

European patent EP 1 203 679 B1, corresponding to U.S. Pat. No. 6,443,517 B1, discloses a cabriolet in which a rollover bar forms a coherent, fixedly connected unit, or a module, with a folding-top storage compartment and a folding top. The fixedly connected unit can be pre-manufactured separately and should at the same time improve the stiffness of the cabriolet, or meet the safety demands imposed on the cabriolet.

SUMMARY OF THE INVENTION

It is accordingly an object of the invention to provide a stiffening device and a vehicle with the stiffening device which overcomes the above-mentioned disadvantages of the prior art devices of this general type, with which the torsional stiffness of the motor vehicle embodied as a cabriolet can be increased, and which can be integrated, in a favorable manner in terms of installation space, and in a structurally simple fashion, into an existing cabriolet concept.

The invention is based on the general concept of disposing a single-part or multi-part stiffening device, for example in the manner of a stiffening plate, between a rear side of a rollover protection device of the cabriolet and a base of a folding-top storage compartment, and to thereby connect the stiffening device at one side to the rear side of the rollover protection device and at the other side to the base of the folding-top storage compartment. Here, the single-part or multi-part stiffening device is rigid in terms of shear and is thereby predestined for increasing the torsional stiffness of the motor vehicle embodied as a cabriolet. As a result of the skillfully selected arrangement of the stiffening device between the rollover protection device and the base of the folding-top storage compartment, the stiffening device can be integrated with the minimum of installation space into an already-existing cabriolet concept, and furthermore ensures optimum stiffening of the body as a result of the fixed connection to the base of the folding-top storage compartment and to the rear side of the rollover protection device. In this way, it is intended to at least reduce in particular a lack of torsional stiffness, referred to in cabriolets as the so-called "shoebox effect".

In one advantageous refinement of the solution according to the invention, the at least one stiffening element of the stiffening device has integrally formed stiffening ribs. Here, stiffening ribs of this type perform the task of so-called binding beams or stiffening webs and make the stiffening elements considerably more rigid overall with respect to twisting. If the stiffening element is formed for example from plastic or cast light metal (Al, Mg), then the stiffening ribs can be directly integrally formed in one working step, for example during the injection molding process, thereby enabling simple and cost-effective production.

In a further advantageous embodiment of the solution according to the invention, the at least one stiffening element is formed from plastic, light metal or cast metal. Forming the stiffening element from plastic or from light metal offers the advantage, which is highly valued in particular in sportscar construction, of being able to obtain an increase in torsional stiffness while generating only a slight increase in weight of the motor vehicle. The weight reduction of the stiffening elements also has a positive effect with regard to an energy requirement of the motor vehicle.

Additional reinforcement elements which are disposed on the stiffening device are expediently provided, which reinforcement elements reinforce the stiffening device in regions. Conceivable here are reinforcement elements which are fixedly connected to the at least one stiffening element of the stiffening device and which additionally reinforce the stiffening element in particular in critical, that is to say highly loaded regions. As a result of the merely additional reinforcement, it is possible to avoid a general reinforcement of the at least one stiffening element, with the associated increase in weight, as a result of which it is likewise possible to create a weight-optimized stiffening device.

It is self-evident that the features specified above and those yet to be explained below can be used not only in the respectively specified combination but also in other combinations or individually without departing from the scope of the present invention.

Preferred exemplary embodiments of the invention are illustrated in the drawing and are explained in more detail in the following description, with identical reference symbols relating to identical or similar or functionally identical components.

Other features which are considered as characteristic for the invention are set forth in the appended claims.

Although the invention is illustrated and described herein as embodied in a stiffening device and a vehicle with the stiffening device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
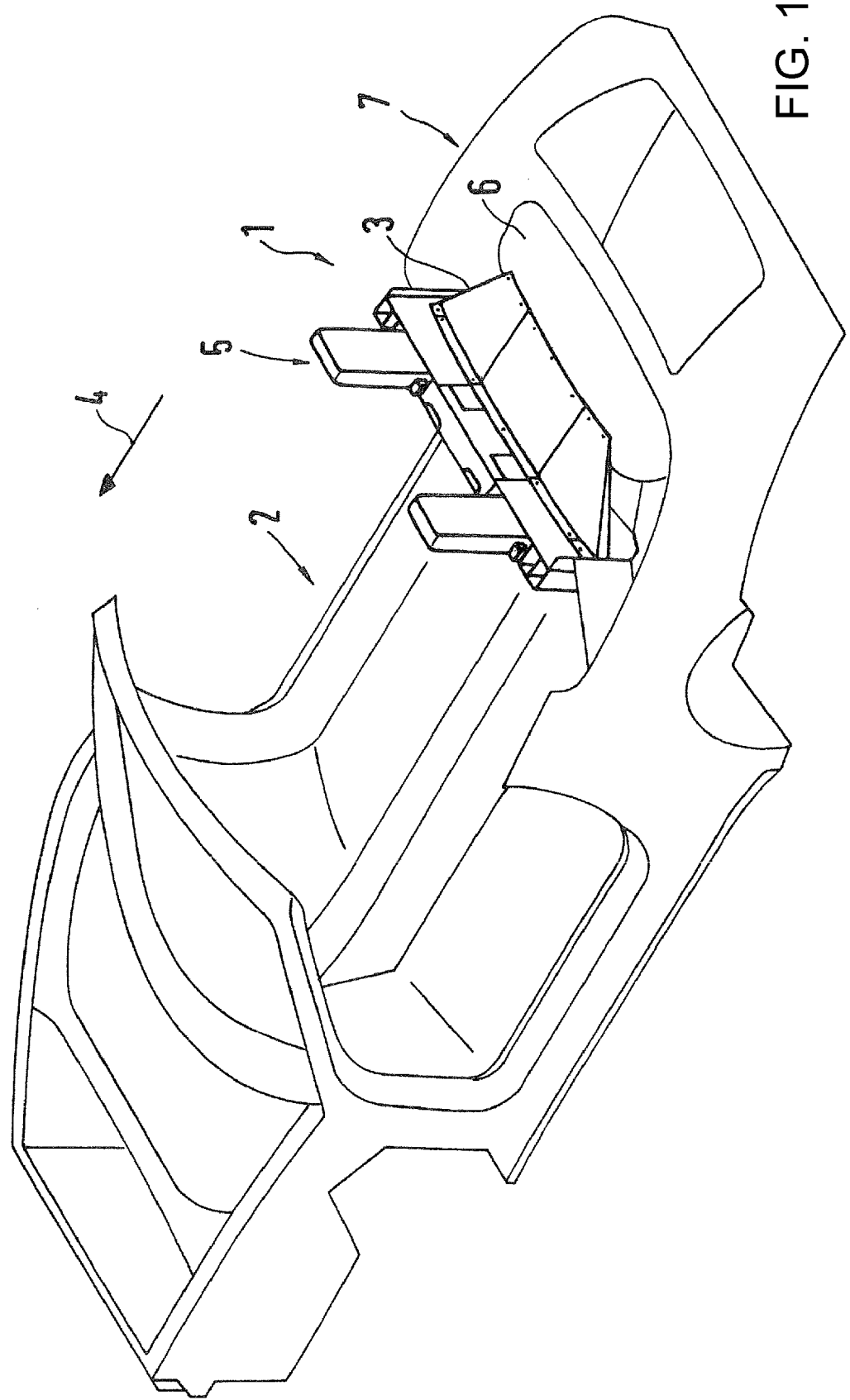
FIG. 1 is a diagrammatic, perspective view of a single-part stiffening device according to the invention in its installed state in a cabriolet.
Figure 2:
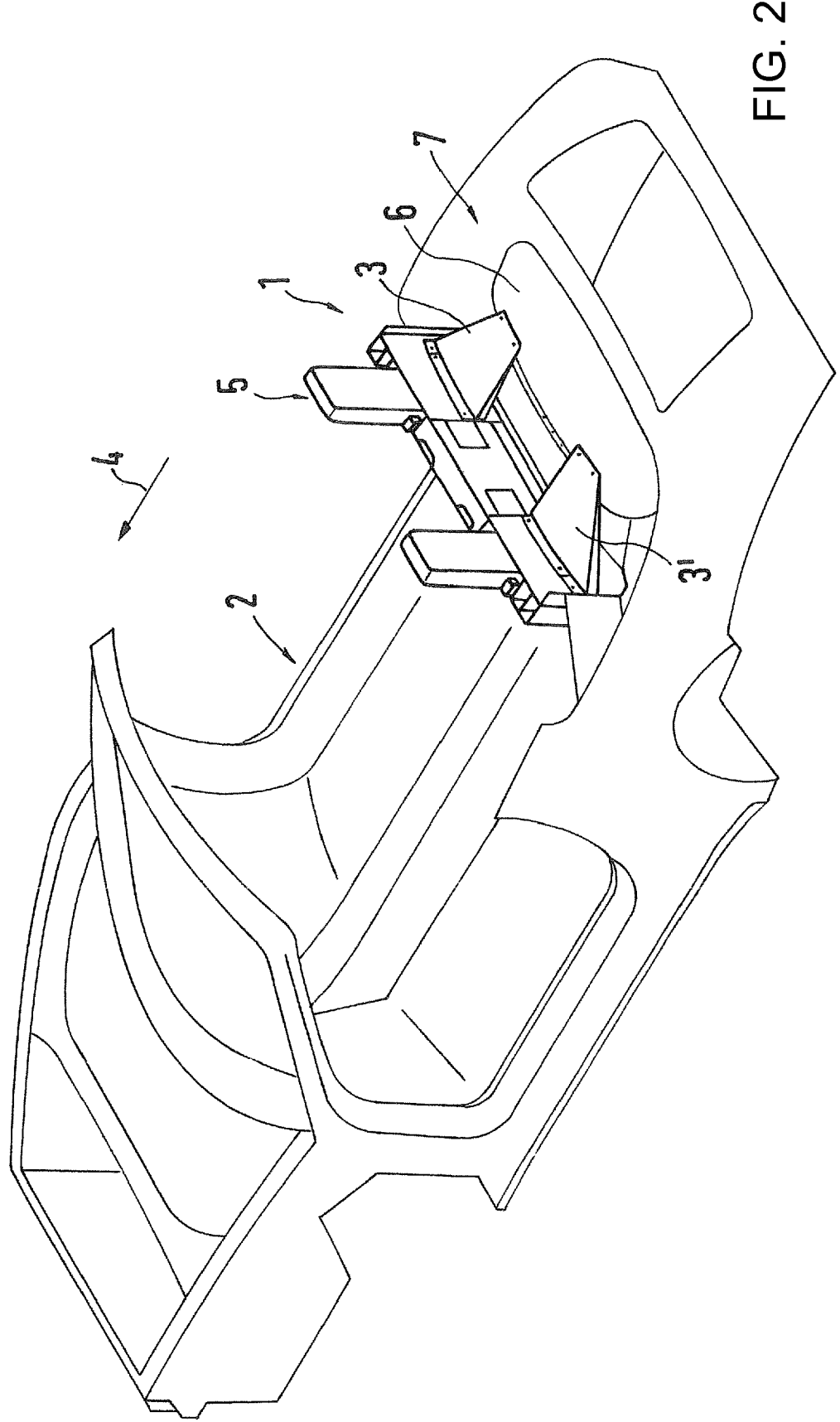
FIG. 2 is a diagrammatic, perspective view as in FIG. 1, but with a multi-part stiffening device according to the invention.

Referring now to the figures of the drawing in detail and first, particularly, to FIG. 1 thereof, there is shown a stiffening device 1 for increasing the torsional stiffness of a motor vehicle 2 embodied as a cabriolet, with the stiffening device 1 as per FIG. 1 having a single stiffening element 3 and with the stiffening device 1 as per FIG. 2 having two stiffening elements 3 and 3'. As can be seen from FIGS. 1 and 2, the stiffening device 1 is disposed behind a rollover protection device 5 in a direction of travel 4, with the stiffening elements 3 and 3' being arranged substantially horizontally. The stiffening device 1 performs the task here of stiffening the cabriolet 2 against twisting. For this reason, the stiffening elements 3 and 3' are connected at one side to a rear side of the rollover protection device 5 and at the other side to a base 6 of a folding-top storage compartment 7 of the motor vehicle 2 (see FIG. 10).

Figure 3:
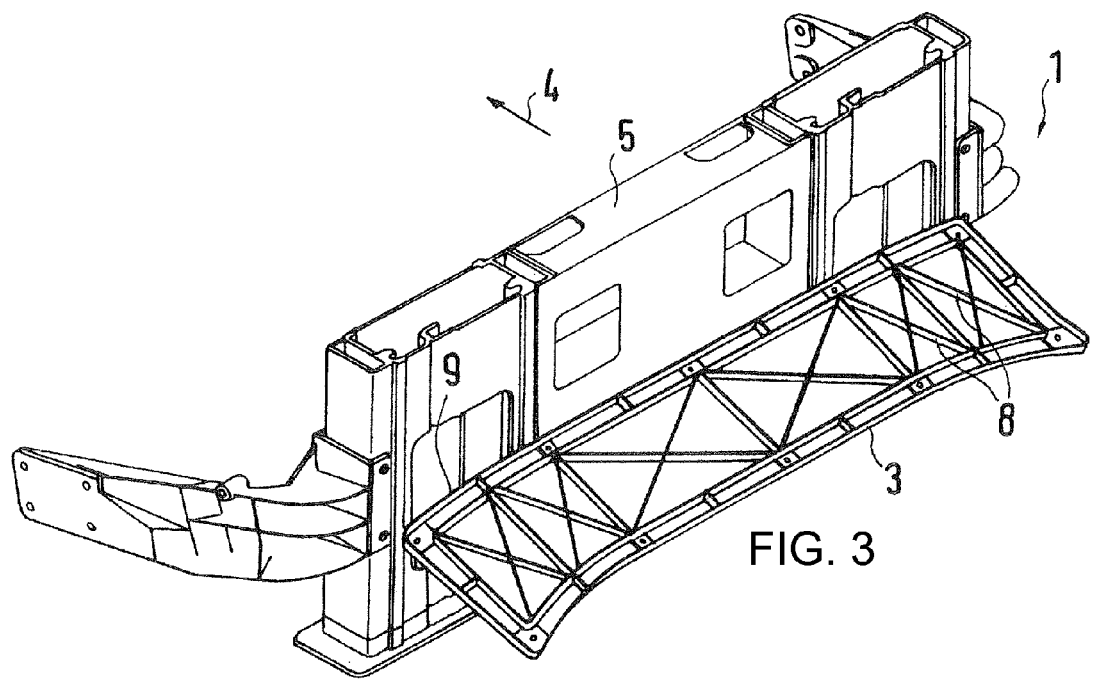
FIG. 3 is a diagrammatic, perspective view of a detail of the single-part stiffening device as shown in FIG. 1.
Figure 4:
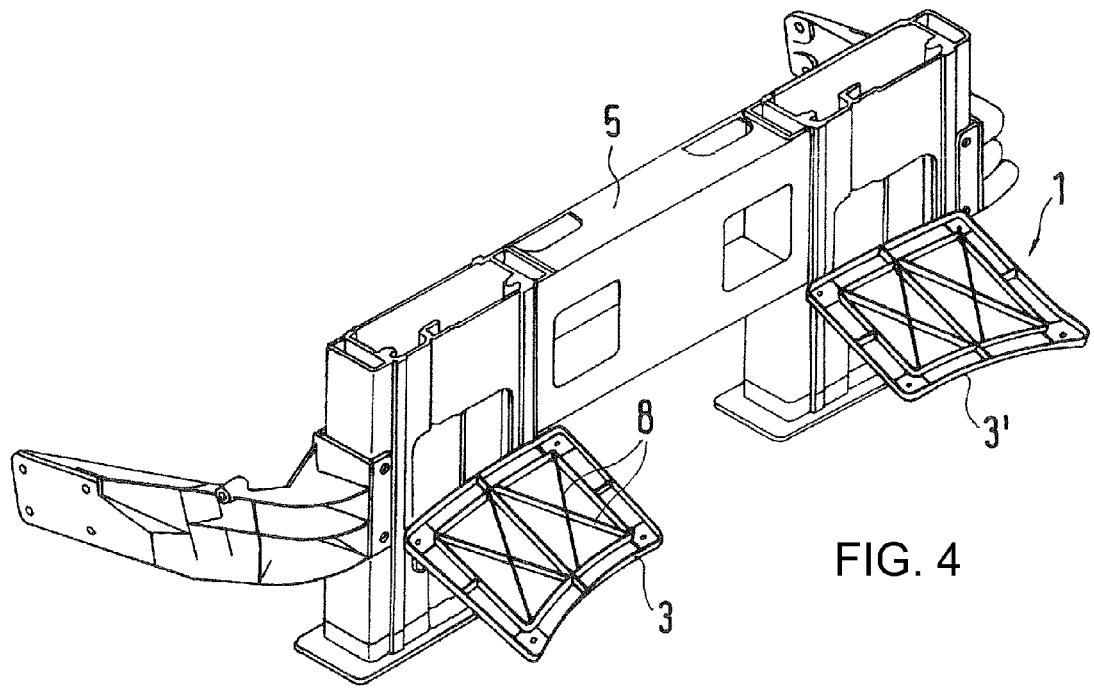
FIG. 4 is a diagrammatic, perspective view of a detail of the multi-part stiffening device as shown in FIG. 2.

FIGS. 3 and 4 show the stiffening devices 1 which, in FIG. 3, have only a single stiffening element 3 and, in FIG. 4, have two stiffening elements 3 and 3'. Arranged on all of the stiffening elements 3, 3' of the stiffening device 1 are integrally formed stiffening ribs 8 which additionally stiffen the respective stiffening elements 3, 3'. Here, the stiffening ribs 8 are aligned upward in FIGS. 3 and 4, while in FIGS. 6 to 8, the stiffening ribs 8 are disposed upward and at least partially downward. It is also conceivable for the stiffening elements 3, 3' to have additional flanges 9 in particular at the edges (see FIG. 6), which flanges 9 additionally stiffen the stiffening elements 3 and at the same time serve to connect the latter to the rollover protection device 5 and to the base 6 of the folding-top storage compartment 7.

Figure 6:
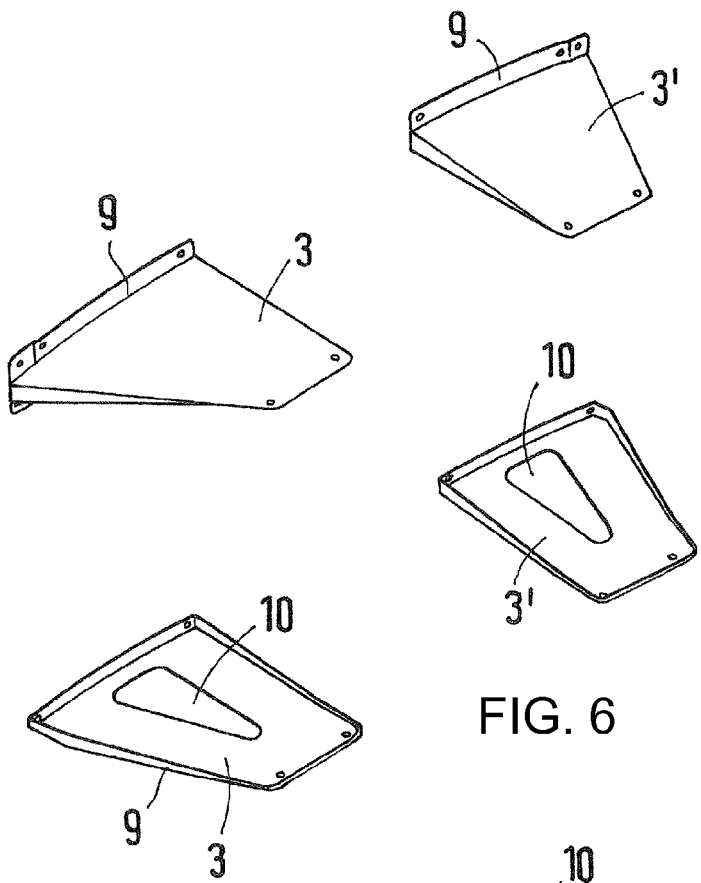
FIGS. 6 to 8 are diagrammatic, perspective views showing different embodiments of the stiffening elements of the multi-part stiffening devices.
Figure 7:
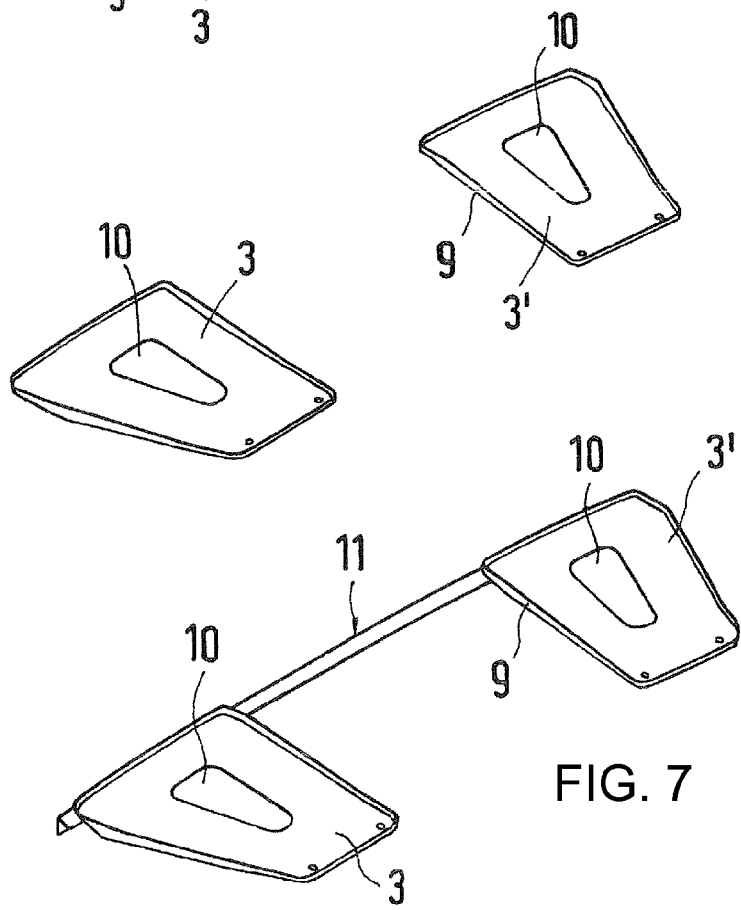
Figure 8:
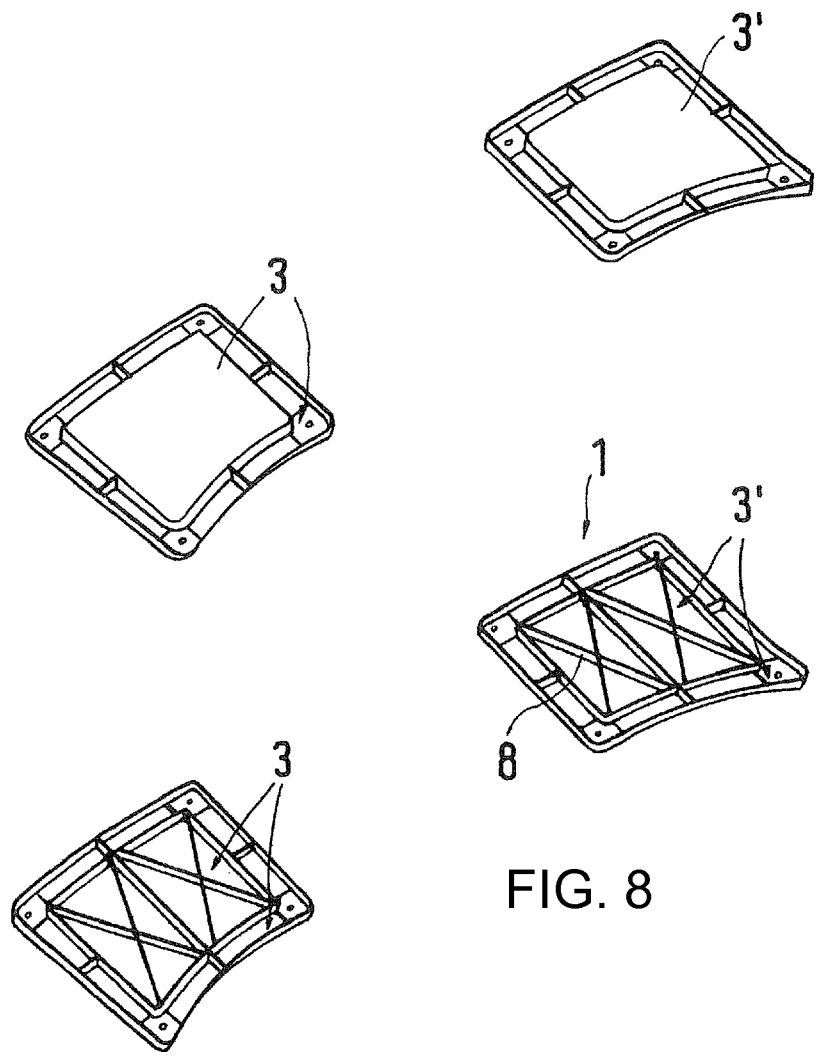

It is also conceivable for the stiffening elements 3, 3' either to have a continuous surface, as shown by way of example in FIGS. 6 and 8, or else to have weight-reducing cutouts 10 as shown partially in FIG. 6 and in FIG. 7.

Here, the stiffening elements 3, 3' of the stiffening device 1 are connected to the rollover protection device 5 and to the base 6 of the folding-top storage compartment 7 preferably by screws, with a respective main screw direction. Therefore for example the stiffening elements 3 and 3' as per FIG. 7 are all screwed to the rollover protection device 5 and to the base 6 of the folding-top storage compartment 7 in a substantially vertical direction, while in the case of a stiffening element as per FIG. 5D, the stiffening element 3 is screwed horizontally to the rollover protection device 5 (better tolerance compensation) and vertically to the base 6 of the folding-top storage compartment 7.

Figure 5A:
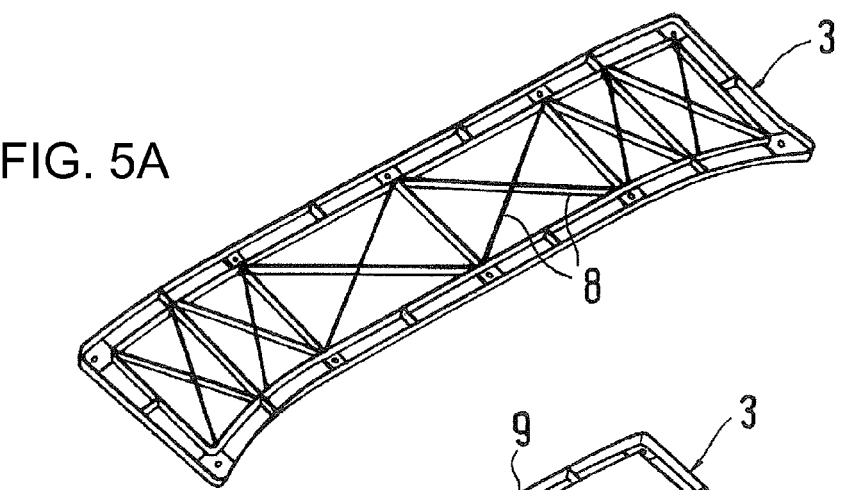
FIGS. 5A-5D are diagrammatic, perspective views showing different embodiments of the single-part stiffening devices.
Figure 5B:
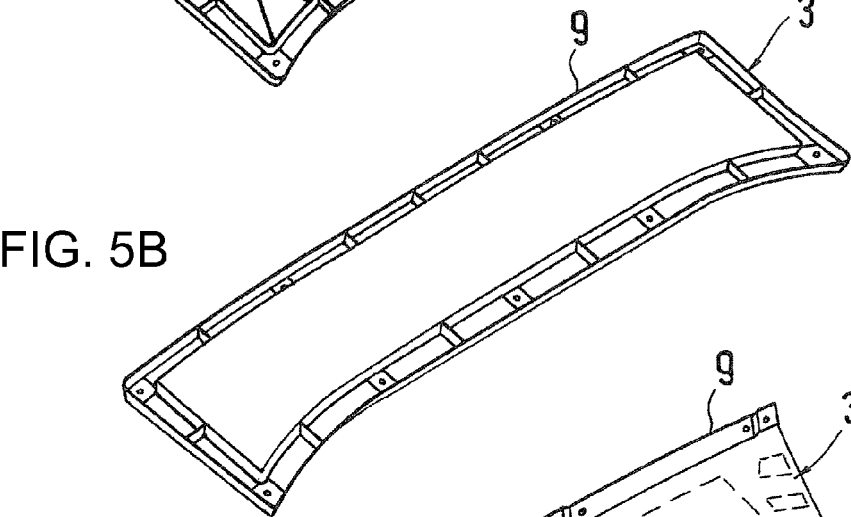
Figure 5C:
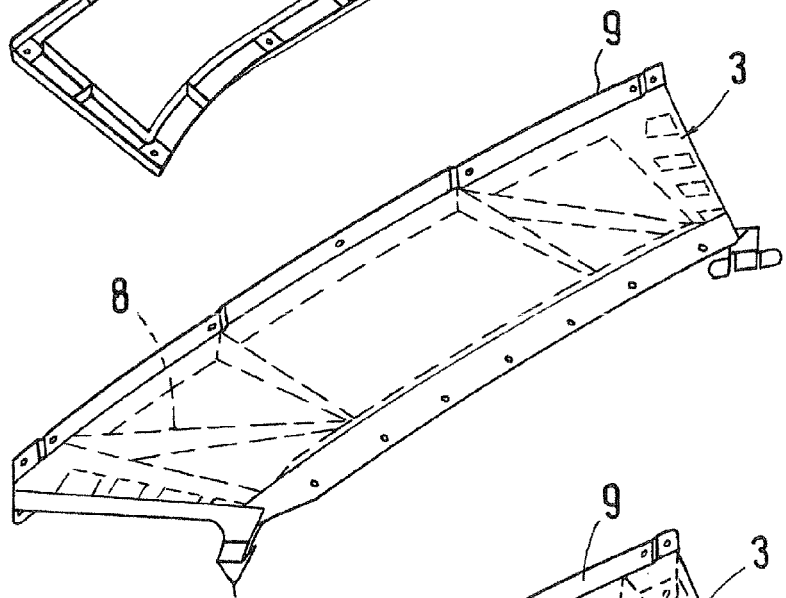
Figure 5D:
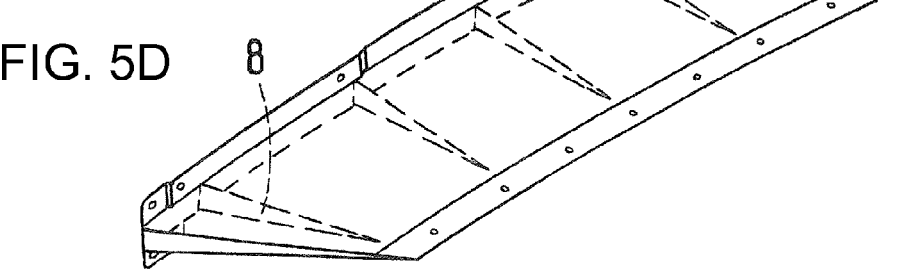

FIGS. 5A to 5D show a variety of embodiments of the stiffening element 3, highlighting in particular the different arrangement of the stiffening ribs 8. While the stiffening element 3 as per FIG. 5A carries the stiffening ribs 8 on an upper side, the stiffening ribs in the stiffening element 3 as per FIG. 5D are arranged primarily on an underside of the stiffening element 3. A wide variety of alignments of the stiffening ribs 8 is conceivable at the same time.

If two stiffening elements 3, 3' are used for the stiffening device 1 according to the invention, these can, as shown in FIG. 7, either be installed separately or can be connected to one another in the vehicle transverse direction by a connecting element 11 which is embodied for example as a steel or light metal strip. The connecting element 11 can also be formed by a retainer or a bracket.

Figure 9:
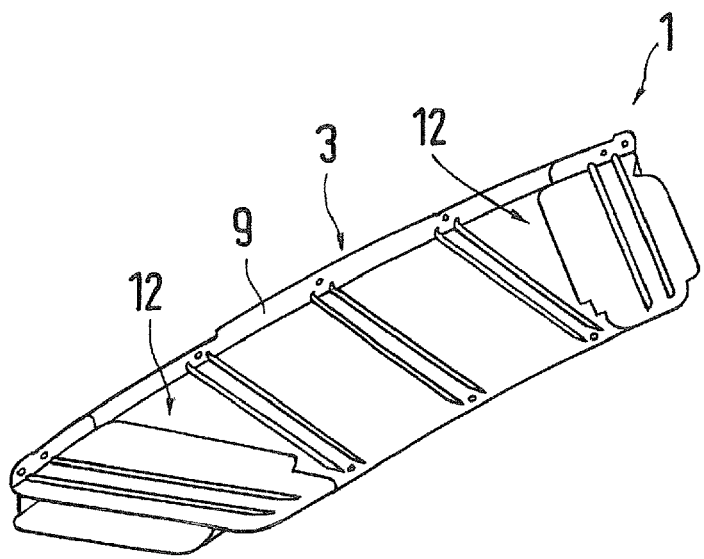
FIG. 9 is a diagrammatic, perspective view of the stiffening device with a partially reinforced stiffening element.

In order to be able to obtain as low an overall weight of the cabriolet 2 as possible in particular in sportscar construction, it is provided that the at least one stiffening element 3, 3' of the stiffening device 1 is formed from plastic, light metal or cast metal. In order be able to obtain a further weight saving, it can be provided that the stiffening elements have cutouts 10 as mentioned above or are merely reinforced in regions, for example by virtue of at least one additional reinforcement element 12 being provided which is arranged on the respective stiffening element 3 (see FIG. 9). Reinforcement elements 12 of the type can be composed of steel, of light metal, in particular of an aluminum sheet, of plastic or of cast metal. In particular, the stiffening elements 3, 3' shown in FIG. 8 can also be formed from cast magnesium.

Figure 10:
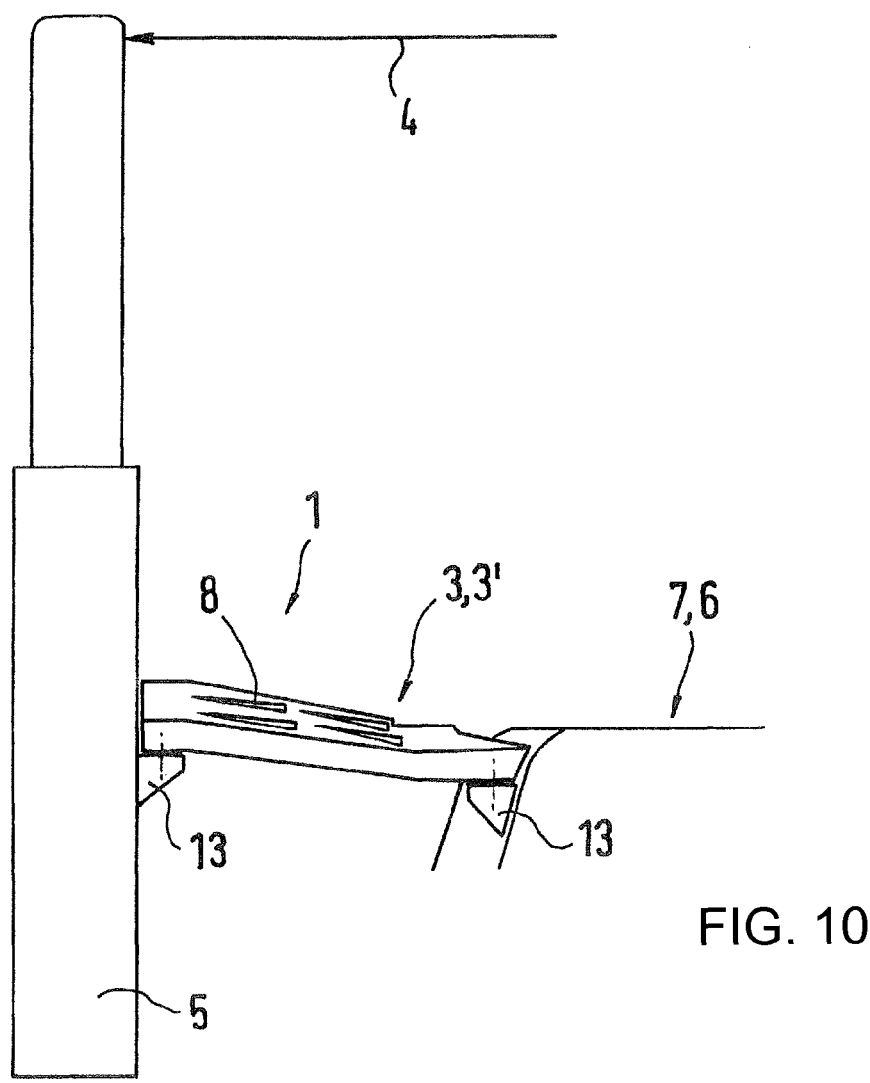
FIG. 10 is an illustration showing an installed position of the stiffening element.

FIG. 10 shows the installed position of the stiffening device 1 according to the invention, with the associated stiffening element 3 being connected with its front end in the direction of travel 4 to a rear side of the rollover protection device 5 and with its rear end in the direction of travel to the base 6 of the folding-top storage compartment 7. Here, brackets 13 are arranged both on the base 6 of the folding-top storage compartment 7 and also on the rear side of the rollover protection device 5, on which brackets 13 the stiffening element 3 rests such that the stiffening element 3 can be screwed vertically to the brackets 13 and a reliable and fixed connection of the stiffening element 3 to the rollover protection device 5 and to the base 6 can thereby be ensured. By use of the stiffening device 1 according to the invention, it is possible in particular for the torsional stiffness of the cabriolet 2 to be increased, such that a "shoebox effect"—caused by the low twisting stiffness—which commonly occurs in cabriolets 2 can be at least reduced. At the same time, the components of the stiffening device 1 according to the invention can be produced in a cost-effective manner, and can in particular be integrated into an already-existing cabriolet concept, as a result of which it is possible to obtain further advantages.

Figure 11:
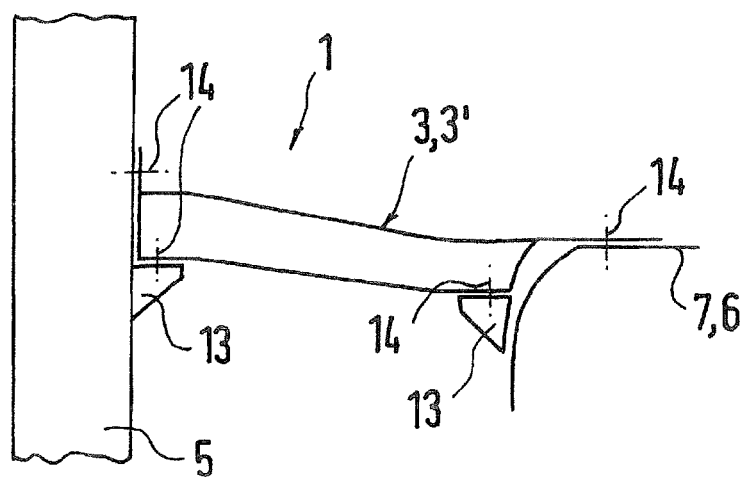
FIG. 11 is an illustration as in FIG. 10, but with a three-dimensional connection of the stiffening element.

One particularly advantageous connection of the stiffening elements 3, 3' of the stiffening device 1 to the rollover protection device 5 and to the base 6 of the folding-top storage compartment 7 is illustrated in FIG. 11.

Both the front end of the stiffening elements 3, 3' and also the rear end are connected to the rollover protection device 5 and to the base 6 of the folding-top storage compartment 7 in each case by screw connections 14 which are arranged offset with respect to one another, so as to create, in effect, a three-dimensional connection, which further increases efficiency.

The screw connections 14 are arranged offset with respect to one another in the vehicle longitudinal direction and vehicle height direction.

The invention claimed is:

1. A stiffening device selected from the group consisting of a single-part stiffening device and a multi-part stiffening device for increasing torsional stiffness of a motor vehicle embodied as a cabriolet, the stiffening device comprising:
   at least one stiffening plate formed from a cast metal and having a first side connected at a rear side of a rollover protection device of the motor vehicle and a second side connected at a base of a covering shelf of the motor vehicle, said stiffening plate being a horizontally aligned stiffening plate having stiffening ribs; and
   brackets disposed on the base of the covering shelf and on the rear side of the rollover protection device, said stiffening plate resting on said brackets and said stiffening plate being vertically screwed to said brackets.

2. The stiffening device according to claim 1, wherein said stiffening ribs of said at least one stiffening plate are aligned one of at least upward and upward and partially downward.

3. The stiffening device according to claim 1,
   further comprising a connecting element; and
   wherein said stiffening plate is one of two stiffening plates which are connected to one another in a vehicle transverse direction by said connecting element.

4. The stiffening device according to claim 3, wherein said connecting element is one of a light-metal strip and corresponding bracket elements.

5. The stiffening device according to claim 1, wherein said at least one stiffening plate is screwed to the rear side of the rollover protection device and to the base of the covering shelf of the motor vehicle.

6. The stiffening device according to claim 1, further comprising at least one additional reinforcement element disposed on said stiffening plate, said additional reinforcement element reinforces said stiffening plate in regions.

7. A motor vehicle, comprising:
   a rollover protection device having a rear side;
   a covering shelf having a base;
   a stiffening device selected from the group consisting of a single-part stiffening device and a multi-part stiffening device for increasing torsional stiffness of the motor vehicle, said stiffening device containing at least one stiffening plate formed from a cast metal and having a first side connected at said rear side of said rollover protection device and a second side connected at said base of said covering shelf, said stiffening plate being a horizontally aligned stiffening plate having stiffening ribs; and
   brackets disposed on said base of said covering shelf and on said rear side of said rollover protection device, said stiffening plate resting on said brackets and said stiffening plate being vertically screwed to said brackets.

8. The motor vehicle according to claim 7, wherein said stiffening ribs of said at least one stiffening plate are aligned one of at least upward and upward and partially downward.

9. The motor vehicle according to claim 7, wherein:
   said stiffening device has a connecting element; and
   said stiffening plate is one of two stiffening plates which are connected to one another in a vehicle transverse direction by said connecting element.

10. The motor vehicle according to claim 9, wherein said connecting element is one of a light-metal strip and corresponding bracket elements.

11. The motor vehicle according to claim 7, wherein said at least one stiffening plate is screwed to said rear side of said rollover protection device and to said base of said covering shelf.

12. The motor vehicle according to claim 7, wherein said stiffening device has at least one additional reinforcement element disposed on said stiffening plate, said additional reinforcement element reinforces said stiffening plate in regions.

* * * * *

UNITED STATES PATENT AND TRADEMARK OFFICE
Certificate

Patent No. 7,891,706 B2                                                             Patented: February 22, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Josip Vlahovic, Freiberg am Neckar (DE); Hans-Jürgen Schmitt, Muehlacker (DE); Felix Hermann, Leonberg (DE); and Dominik Beierl, Korntal-Muenchingen (DE).

Signed and Sealed this Eleventh Day of March 2014.

*PAUL N. DICKSON*
*Supervisory Patent Examiner*
Art Unit 3616
Technology Center 3600